(No Model)

H. UTTER.
ANIMAL TRAP.

No. 585,489. Patented June 29, 1897.

Witnesses:
Franck L. Ourand
Jos. L. Coombs

Inventor:
Hiram Utter
By Louis Bagger & Co.
Attorneys

THE NORRIS PETERS CO., PHOTO-LITHO., WASHINGTON, D. C.

United States Patent Office.

HIRAM UTTER, OF GILSON, ILLINOIS.

ANIMAL-TRAP.

SPECIFICATION forming part of Letters Patent No. 585,489, dated June 29, 1897.

Application filed March 10, 1897. Serial No. 626,825. (No model.)

*To all whom it may concern:*

Be it known that I, HIRAM UTTER, a citizen of the United States, and a resident of Gilson, in the county of Knox and State of Illinois, have invented certain new and useful Improvements in Animal-Traps; and I do hereby declare that the following is a full, clear, and exact description of the invention, which will enable others skilled in the art to which it appertains to make and use the same, reference being had to the accompanying drawings, which form a part of this specification.

My invention relates to animal-traps; and its object is to provide an improved construction of the same whereby I provide a trap which will automatically set itself after a mouse or other animal has trapped itself.

The invention consists in the novel construction and combination of parts hereinafter fully described and claimed.

Figure 1:
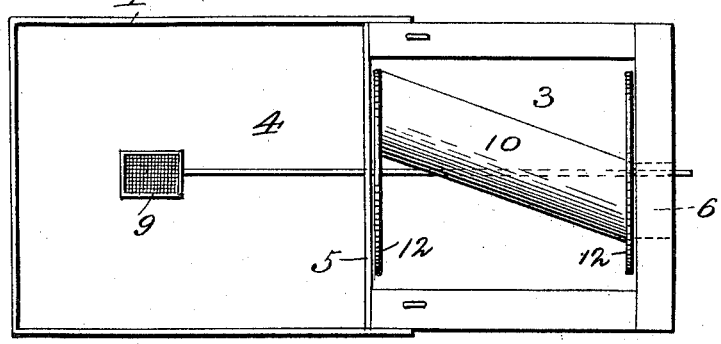
Figure 2:
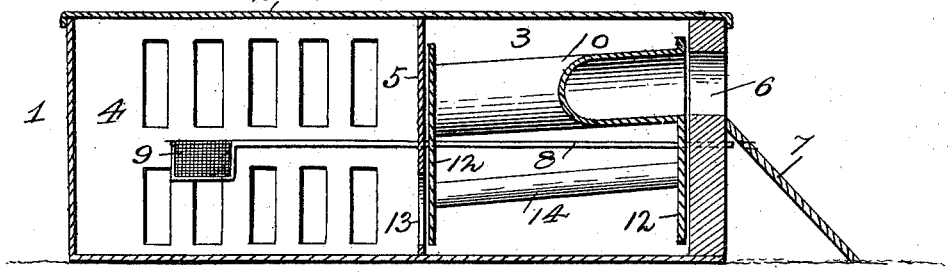
Figure 3:
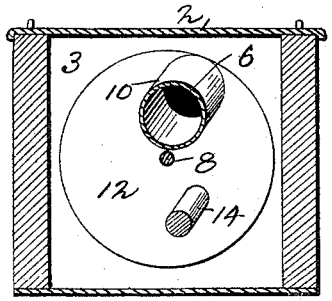
Figure 4:
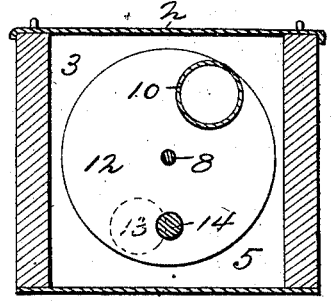
Figure 5:
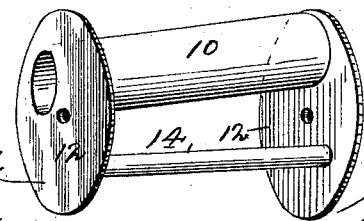

In the accompanying drawings, Figure 1 is a plan view of an animal-trap constructed in accordance with my invention, the top being removed to show the interior thereof. Fig. 2 is a longitudinal sectional view on the line $xx$, Fig. 1. Fig. 3 is a transverse sectional view on the line $yy$, Fig. 1, looking to the right. Fig. 4 is a similar view looking to the left. Fig. 5 is a perspective view of the tube removed.

In the said drawings the reference-numeral 1 designates a rectangular box provided with a removable cover 2. This box is divided into two compartments 3 and 4 by a vertical partition 5, hereinafter described, located at or near the center thereof. I prefer to make the walls of the front of this box solid, while the rear portion is preferably made of open-work or of wire, so that the interior of the compartment 3 can be seen. The front wall of the box 1 is formed with a circular hole 6 for the entrance of the animal, and is provided with an inclined plank or platform 7 to enable the animal to reach the opening. Passing through the front of the box and the partition 5 is a horizontal rod 8, to the inner end of which is secured a bait-box 9.

The numeral 10 designates a rotatable open-ended tube located in the front compartment 3, and at each end is provided with a disk 12, journaled on said rod. This tube is inclined both vertically and horizontally to the axis of the rod, and when in normal position one end will register with the opening in the front of the box.

The partition 5, near its lower end and at one side of its center, is formed with an opening 13, which is closed by the disk at the end of said tube when the latter is in normal position.

The numeral 14 designates a weight secured to the tube.

The operation is as follows: When the trap is set, the weight 14 will cause the front open end of the tube 10 to register or coincide with the opening in the front of the box. If a mouse or other animal now ascends the inclined plank and enters the tube, when it shall have passed the center of the latter its weight will cause the tube to turn, so that its lower end will register or come into coincidence with the opening in the partition, when the animal will enter the compartment 4. The weight 14 will cause the tube to immediately return to normal position, the inner disk 12 closing the opening in partition 5 and imprisoning the animal. At the same time the trap will be set to receive another animal.

Having thus fully described my invention, what I claim is—

In an animal-trap the combination with the box having an opening in its front, and a partition at or near its center formed with an opening, of the horizontal rod, the bait-box, and the open-ended weighted tube inclined vertically and horizontally to the axis, of the rod, and the disks journaled on said rod to which said tube is secured, substantially as described.

In testimony that I claim the foregoing as my own I have hereunto affixed my signature in presence of two witnesses.

HIRAM UTTER.

Witnesses:
J. A. DUNCAN,
J. HOUSER.